Aug. 24, 1954  R. N. HARMON ET AL  2,687,482
ELECTRIC GENERATOR
Filed June 4, 1945  2 Sheets—Sheet 1

WITNESSES:
C. L. Oberheim

INVENTORS
Ralph N. Harmon and
Edward J. Naumann.
BY
Paul E. Friedemann
ATTORNEY

Aug. 24, 1954

R. N. HARMON ET AL 2,687,482

ELECTRIC GENERATOR

Filed June 4, 1945

WITNESSES:
E. L. Oberheim

INVENTORS
Ralph N. Harmon and
Edward J. Naumann.
BY
Paul E. Friedemann
ATTORNEY

Patented Aug. 24, 1954

2,687,482

UNITED STATES PATENT OFFICE 2,687,482

ELECTRIC GENERATOR

Ralph N. Harmon and Edward J. Naumann, Baltimore, Md., assignors, by mesne assignments, to the United States of America as represented by the Secretary of the Navy Application June 4, 1945, Serial No. 597,573

2 Claims. (Cl. 310—156)

This invention relates generally to ordnance devices and more particularly to ordnance fuses of the type which may be adjusted to respond to the proximity of a target over a predetermined range of distances therefrom.

In certain of its aspects this invention is related to a copending application of E. J. Naumann, Serial No. 597,571, filed on the same date as this application, entitled Electrically Operated Devices and assigned to the same assignee as this invention.

In certain other of its aspects, this invention is related to a copending application of R. N. Harmon and E. J. Naumann, Serial No. 597,572, filed on the same date as this application, entitled Drive Devices, and assigned to the same assignee as this invention.

Proximity fuses are applied to various types of bombs, shells, torpedoes, etc., and usually have a small, very compact radio transmitter built into the fuse which is generally attached to the nose of the projectile. The operation of this radio unit in most cases depends upon the Doppler effect but sometimes the result is obtained by photoelectric circuits or other means of electrical discharge or response when the fuse equipped projectile approaches its target.

With all such electrically operated proximity fuses, an electrical power supply is required to energize the various electrical components of the electronic system. In most of these systems, in addition to various low-voltage power supply sources, a high-voltage plate supply for the tubes is required, usually of the order of, say, 150 volts. Heretofore small batteries have furnished the required electrical power. These batteries have many disadvantages. In almost all fuses the space is limited and it is essential that the power supply for these fuses occupy as little space as possible. For the most part such batteries are bulky and must be made up in special cases to conform to certain design requirements. The power produced with respect to the size of the batteries must be very large and as a consequence high efficiency batteries are needed. These have a relatively short life when stored. After a short shortage period their power may drop to such a low level as to render them useless in a proximity fuse. Batteries are further objectionable in that they are not dependable when exposed to low temperatures. Still further, with such fuse power supplies there is a constant danger that the fuse might be exploded inadvertently due to a short circuit or for some other reason resulting in an electrical discharge into the heater which ignites the squib, for the reason that the batteries throughout their life when once connected in the fuse circuits offer an ever present source of electrical energy.

Thus this invention has for one of its important objects the provision of a proximity type of ordnance fuse which is entirely reliable in its operation.

Another object of this invention is to provide an ordnance fuse of the character mentioned in which inadvertent application of the power supply for the circuit elements of the fuse is minimized.

Another object of this invention is to provide an ordnance fuse of the type described in which deterioration of the power supply therefor with time is practically negligible.

A specific object of this invention is to utilize a small generator as the source of power in a proximity fuse which generator, for example, may be driven by a suitable fluid operated device.

The invention, as illustrated in the drawings, is applied to a proximity type of ordnance fuse suitable for application to bombs, rockets and other projectiles. In this connection it is essential that a generator employed as the electrical energy source in such a fuse be relatively small in order to keep the fuse dimensions at a minimum, otherwise the overall length of the fuse equipped projectile may be such as to prevent the projectiles being handled in conventional apparatus. This is particularly true in the case of bombs where too large a fuse may mean the fuse equipped bomb has to be handled in bomb racks capable of handling much heavier standard or contact types of bombs. Thus the carrying capacity of the aircraft carrying the fuse equipped bomb is not limited by the aerodynamic power developed but by the available bomb carrying space. An additional advantage of the small fuse is, it does not interfere with the flight of the fuse equipped projectile and the projectile may be directed to its objective with standard sighting and computing equipment.

Thus this invention has for another of its objects the provision of a proximity fuse for a projectile which is sufficiently small and otherwise of such design as not to interfere with the flight of the fuse equipped projectile.

Yet another object of this invention is to provide a proximity fuse for a projectile which is of such small size as to permit the use of the fuse equipped projectile in an ordnance equipment designed for that particular size of projectile.

An ancillary object of this invention is to provide an alternator or generator of small physical dimension having a high electrical output for its size and which may, in accomplishing the high electrical output, be operated at high speed.

Another ancillary object of this invention is to provide an alternator or generator which may be easily manufactured and assembled.

A further ancillary object of this invention is to provide an alternator or generator of such design that it may be manufactured to close tolerances without great additional manufacturing expense.

Yet another ancillary object of this invention is to provide an alternator or generator which may be operated at high speeds with a minimum of driving effort.

Further separate and combined objects of this invention are to provide an alternator or generator adapted for use in a proximity type of fuse which results in an overall reduction of the fuse length, requires less material to make, requires but a single coil assembly instead of a plurality of assemblies as in the case of the salient pole-type of generator, has low mechanical rotor inertia, which, for the specific application to the proximity type of fuse, has a high leakage reactance to obtain good output regulation with varying speeds, has less vibration and which may be provided with any suitable number of poles commensurate with good magnetic design without consideration of coil space between poles.

Other objects and advantages will become apparent from a study of the following specification when considered in conjunction with the accompanying drawings, in which.

Figure 1:
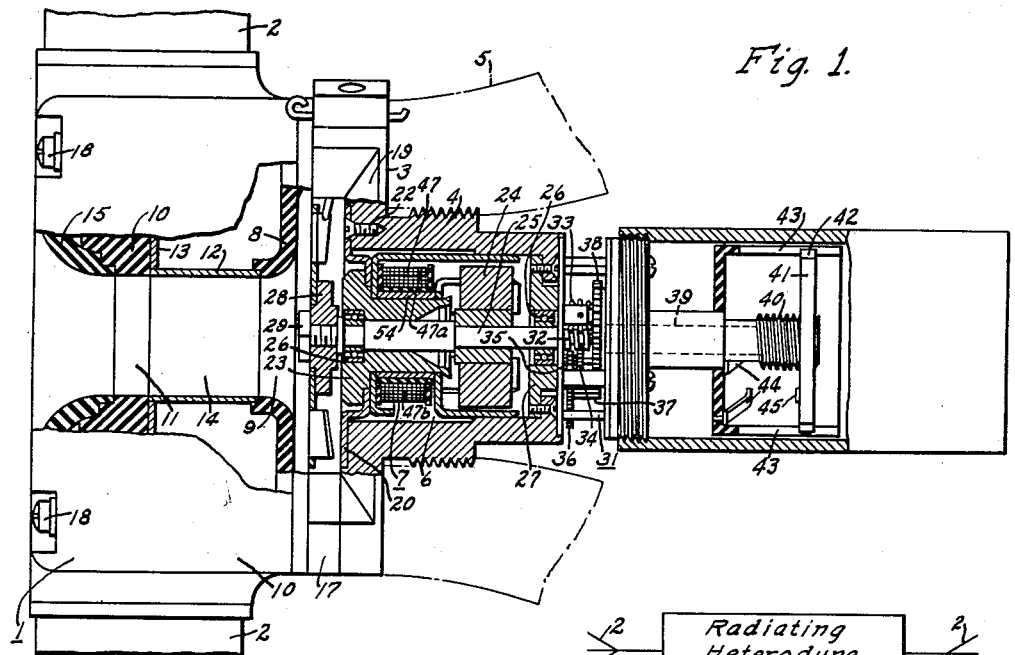
Figure 1 is a sectional view of a proximity fuse illustrating the arrangement of this invention.

A fuse of the type which depends for its operation upon the Doppler effect is illustrated in Figure 1 of the drawings. Systems for the operation of such electronic fuses sometimes consist of a radiating heterodyne detector. An arrangement of this type is shown in the block diagram of Fig. 8. The antennae, which are connected to the radiating heterodyne detector, radiate energy to the target which, in turn, reflects the radiated energy back to the fuse. The reflected signal, which is received, mixes with the direct signal from the oscillator as in a heterodyne receiver. The reflected signal frequency is dependent upon the velocity of the fuse with respect to the target as well as the frequency of the direct signal. The Doppler frequency equations relate the direct signal frequency to the reflected signal frequency if the velocity between the signal source and the observer, or in this case, the receiver is considered equal to twice the relative velocity of the fuse and the target. This condition substantially obtains because of the relative motion between the receiver in the fuse and the target and, therefore, the reflected signal, in most cases, differs in frequency from the direct signal. The reflected wave, which is received, upon being mixed with the direct signal, produces a beat frequency signal. This beat signal increases in amplitude as the fuse approaches the target; it is amplified in the amplifier which is shaped to respond only to the limited ranges of Doppler frequencies and then passed to the trigger circuit where it is utilized to trigger, for example, a thyratron tube, which, when the beat signal amplitude is sufficient, becomes conducting and passes current through a heater buried in a small charge of powder. This assembly is generally known as a squib and forms part of a powder train for igniting the main powder charge of the bomb.

The electronic elements of the proximity fuse are carried in the forward extremity 1 (see Figure 1) of the fuse and are connected to the dipoles or antennae 2 from which the direct signals are transmitted and upon which the reflected signals are received. The dipoles or antennae 2 are shown only fragmentarily since their proportions are unessential to this invention. The fuse body consists of a metal die casting 3 of nonmagnetic material, for example, manganese or aluminum provided with a cylindrical externally threaded section 4 which threads into the nose of the projectile 5 indicated in dot-dash outline. Internally of the cylindrical section 4, a well 6 is provided which receives the alternator or generator 7. In the enlarged end of this die casting, a turbine chamber is formed. The forward extremity 1 of the fuse, which carries the dipoles and houses the electronic elements of the radio transmitting and receiving system is preferably formed of a high strength plastic having good electrical insulating properties. It is formed in two main sections, one of which is a platelike member 8 having an aperture 9 centrally thereof and the other section 10 being provided with a plurality of recesses (not shown) internally thereof for receiving certain electrical circuit elements. In addition, an aperture 11 is provided centrally of the section 10. A circumferential groove in the platelike member or housing section 8 receives a complementary edge of the section 10, in which assembled relation of the housing sections the apertures 9 and 11 are coaxially disposed. A tubular section 12, which, as shown, is fabricated as a part of the chassis 13 of the radio units, joins the apertures thereby forming a passage 14 through the assembled housing sections, which passage at its frontal extremity is completed by a plate 15 which seals the front of the housing section 10 and presents a smooth curved surface to the air stream entering the passage upon motion of the fuse through the atmosphere. A plug terminal 17 of insulating material completes the lower portion of the turbine chamber. All wires leading from the generator and to other electrical elements of the fuse, such as the heater for igniting the squib (shown in Fig. 8), pass through this plug. A complementary receptacle (not shown) in the plate 8 carries these circuits through to the electronic elements in the housing section 10. This assembly of housing sections is secured by means of through bolts 18 which thread into the housing section 3. A pair of diametrically opposite, radially disposed passages, one of which appears at 19 in the housing section 3, provide exhaust exits for the turbine chamber.

The generator 7 is secured within the well 6 by means of plate 20, which is secured as by spot welding to one extremity of the pole or stator structure 21 (see Fig. 2) thereof, and which is secured to the housing section 3 by means of a plurality of circumferentially spaced screws 22. In this position the pole extremities project into a reduced section of the well 6 whereby they are arranged in a perfect circle about an axis defined by the center line of the combination cylindrical core structure and bearing housing 23. A permanent magnet rotor 24 having a number of alternately magnetized poles is secured upon a shaft 25 which is journalled between the bearings 26, one of which is housed in the member 23 and the other of which is housed in the end plate 27 secured in the cylindrical extremity of the fuse housing.

The end of the generator shaft projecting into the turbine chamber is screw threaded to receive the hub of the turbine rotor 28 which thereafter is locked in threaded position by the lock nut 29. The other extremity of the generator shaft which extends into the gear reduction unit 31 is turned to the shape of a worm 32 which meshes with the worm wheel 33. The other end of this worm wheel shaft is also worm cut, but which cannot be seen in the drawing, to mesh with a worm wheel 34. Worm wheel 34 drives the small gear 35 secured to rotate therewith, which, in turn, drives the large gear 36 having the small gear 37 integral therewith. Gear 37 drives the large output gear 38 having the shaft 39 secured to rotate therewith. Shaft 39 extends into the arming contact chamber and in this chamber is slotted along a portion of its length to receive a complementary projection of externally threaded member 40 which is thus secured to the reduction gear unit output shaft. A disk 41, comprising a central metallic threaded section which threads onto threaded member 40, and an outer insulating section, is provided with projections 42 on the periphery thereof which operate in slots 43 in the arming contact chamber to prevent the disk from following the threaded member 40 in rotation. Spring contacts 44 are secured to the arming contact housing. Mating contacts 45 are carried in the insulating section of the disk 41. The disk 41 moves to the left as viewed in Figure 1 when the threaded member 40 rotates and the contacts close. Thereafter the disk runs off the threads of the threaded member where it is locked in contacting position by the thread extremities without interfering with further rotational movement of the threaded member. Thus the turbine drive through the generator and gear reduction unit is unimpeded.

When the projectile is in free flight an air stream is induced through the turbine chamber which is the result of the pressure differential existing between the entrance and exhaust passages of the turbine chamber. As a consequence a high velocity air stream impinges on the blades of the turbine (which blades are simple punchings bent from the disk of the turbine) and drives the turbine in rotation. As the turbine increases in speed the generator output increases and through the electrical connections, before noted, energizes the electronic system causing the tubes thereof to be heated, and after a short interval a signal is applied along the dipoles. After a short time interval, sufficient to permit safe arming, the turbine will have made the required number of revolutions to drive the contact disk to a position in which the circuit arming contacts 44 and 45 are closed. When the beat signal reaches a predetermined amplitude indicating the projectile is in predetermined proximity of its objective, the thyratron tube is triggered and discharges through the arming contacts 44 and 45 into the heater igniting the squib and associated powder train (not shown) which detonates the projectile.

The alternator 7, because of its small size, is entirely housed within the well 6 formed in the fuse body portion which threads into the nose of the projectile 5. It comprises the stator 21 which carries but a single winding assembly 47 and a rotor 24 of the permanent magnet type. The stator 21 includes a pair of magnetic members 48 and 49 (see Figs. 2 and 3), one of which, 48, has a plurality of fingerlike pole pieces 50 which are circumferentially spaced and extend longitudinally of the stator assembly. These pole pieces at one extremity are joined by a transverse plate 51. The assembly may be a single piece configuration, as shown, or may be fabricated in any suitable manner of a number of pieces. The single piece construction, however, is prefered since magnetic losses at joints are eliminated. The other member 49 of magnetic material has a plurality of fingerlike pole pieces 52 equal in number to the pole pieces 50 and of lesser length than the pole pieces 50 joined at one extremity by a transverse plate 53, the assembly being a single piece punching. The pole pieces of each of these elements are disposed in circumferentially spaced interlocking relationship such that their free extremities lie substantially in a single transverse plane. As a result, an axial spacing of the transverse plates 51 and 53 obtains. A split tubular section 54 of magnetic material is disposed in abutting relationship between the transverse plates and this assembly together with the supporting plate 20 abutting the transverse plate 51 is securely joined by the cylindrical core 23 by spinning over of the extremity of the core at 55. A single coil, or a plurality of concentrically arranged coils 47a and 47b, as shown, or coaxially disposed coils, forming the coil assembly 47, encircles the split tubular section 54. Voltages generated in the coils 47a and 47b supply the fuse system in the manner diagrammatically illustrated in Fig. 8. The output of the high-voltage coil is rectified and filtered before application to the plate circuits of the electronic system while the output of the low-voltage coil 47b is applied directly to the filament circuits. The generator shaft 25, as previously described, is journalled in the bearings 26, one of which is secured in the core member 23. If desired, the bearing supported in the member 27 may be located in the core extremity at 55 and the shaft thus journalled entirely in the core section. The extension of the generator shaft 25 extending to the right of the core member 23 has securely disposed thereon the generator permanent magnet rotor 24 having six alternate north and south magnetic poles. With this arrangement it will be seen that for an instantaneous position of the permanent magnet generator rotor 24, a magnetic flux may flow in the stator magnetic circuit to the left through the fingerlike pole pieces 52 through the core section 23 and thence to the right through the pole pieces 50 back to the rotor. As the rotor moves angularly in rotation the alternately magnetized rotor poles are reversed in position in proximity to the stator poles and as a consequence a reversal in flux direction through the stator magnetic circuit occurs. These alternations of the magnetic flux induce voltages in the coil assembly 47 depending upon the frequency of the reversals and the density of the magnetic flux.

In applications of the type disclosed, it is usually desired to render the generated electrical output, at least to a large degree, if not entirely, independent of the speed of operation of the generator rotor. This may be accomplished in any manner desired. One method found satisfactory has been to design the generator to have a fairly large leakage reactance; another method could be to operate the magnetic circuits near saturation for fairly low rotational speeds. In any case, the method employed is believed contemplated within the scope of the teachings of this invention.

The type of rotor illustrated in Figure 1 as well as the remaining figures of the drawing has a smooth periphery. Such a rotor is spot magnetized for any suitable number of poles. The structural strength advantages are self-evident and hence the rotor is well suited for the very high operating speeds of the turbine which range from, say, 12,000 R. P. M. to as high as 60,000 R. P. M. Another desirable characteristic is the windage losses of the rotor result only from skin friction which can be made negligible by suitable finishing. As a consequence, the available power at the turbine is more efficiently utilized.

Such a rotor, by way of example, may be made of a magnetic combination of aluminum, nickel, cobalt, and iron. It is spot magnetized by placing six equally distributed coil carrying poles thereabout and applying a heavy surge of unidirectional current to the coils. Another method, which substantially increases the degree of magnetization, applies the magnetic field to the rotor during the molding process. Once the rotor has cooled and all machining operations thereon are completed, the magnetic field is again applied in the same direction. The magnetic retentivity of rotors of the type described is high and deterioration thereof with time, insofar as most applications are concerned, is practically negligible.

Figures 2, 3, 8:
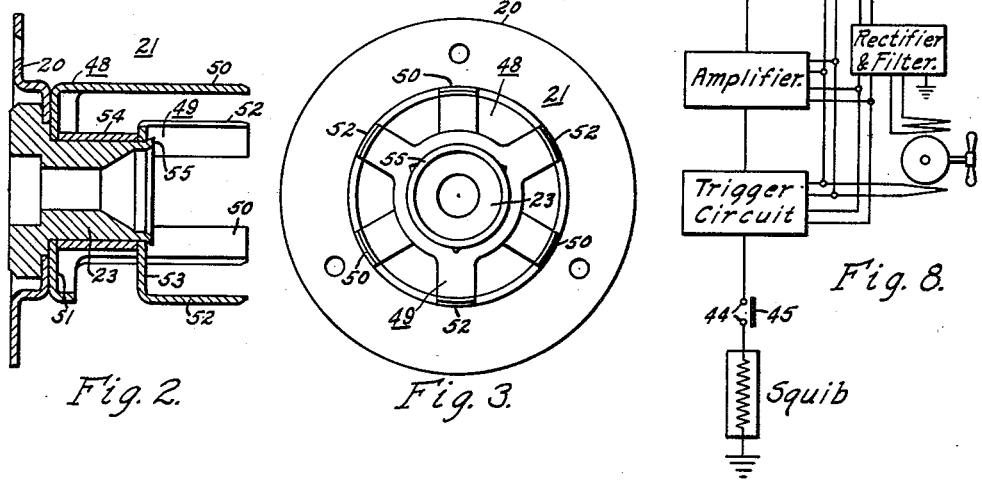
Fig. 2 is a sectional view of the magnetic circuit of, in this case, the stator of the alternator of Figure 1.
Fig. 3 is an end view of Fig. 2.
Fig. 8 is a block diagram of the electrical elements of a typical Doppler operated fuse.
Figure 4:
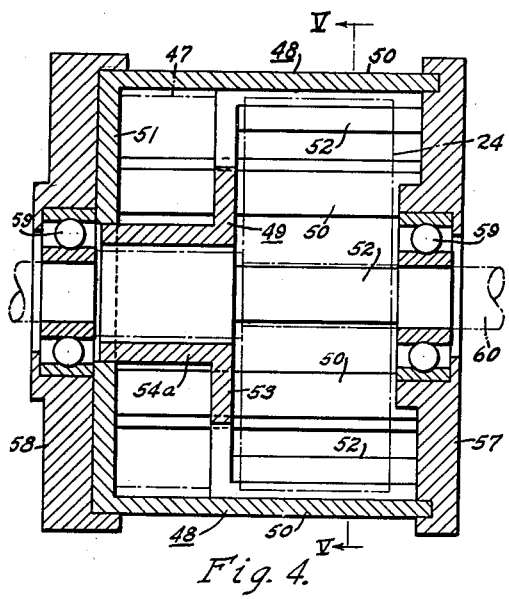
Figs. 4 and 5 are, respectively, longitudinal section and end views of a modified alternator construction.
Figure 5:
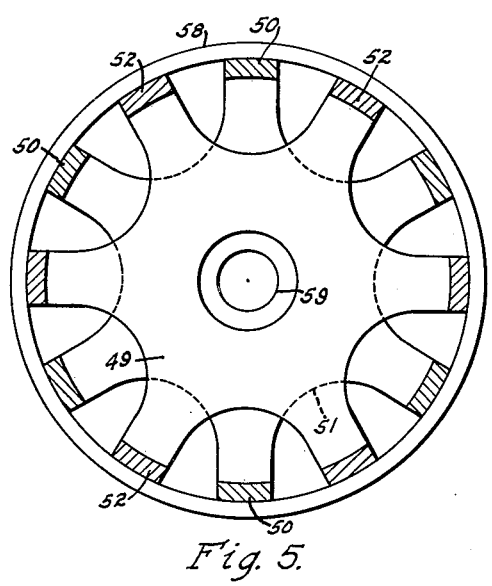

A type of alternator construction, which provides fairly high frequencies at lower rotational speeds than those shown in Figs. 1 to 3, inclusive, is shown in Figs. 4 and 5. In this embodiment of the invention, the pole pieces have been doubled in number over those previously described. Similarly twice the number of rotor poles are employed. Thus, at half the rotor speed a generated quantity having a frequency equal to that possible with the foregoing alternator will be had. This construction again comprises a pair of members of magnetic material 48 and 49, the member 48 having a plurality of circumferentially spaced fingerlike pole pieces 50 extending longitudinally of the stator assembly and joined at one extremity by the transverse element 51, the member 49 having a plurality of circumferentially spaced fingerlike pole pieces 52, of lesser length than those numbered 50 and joined at one extremity by the transverse element or plate 53. In this embodiment of the invention, the tubular section 54a, unlike that numbered 54 in Fig. 2, is a single-piece continuation of the transverse element 53 forming a part of the magnetic member 49. This tubular section at its extremity slides snugly within an opening provided centrally of the transverse element or plate 51. Thus a magnetic circuit is completed from the fingerlike pole pieces 50 through the tubular section 54a to the pole pieces 52. Here again the pole pieces 50 and 52 are disposed in circumferentially spaced interlocking relation and their free extremities terminate in a substantially single transverse plane. An end plate 57 of nonmagnetic material provided with a circular recess in its inner face or a plurality of spaced arcuate recesses receives the extremities of the pole pieces and provides support therefor. A second end plate 58 is disposed adjacent the other extremity of the stator assembly. Each end plate is provided with suitable bearings 59 concentrically disposed of the pole circle formed by the circumferentially spaced pole pieces and a shaft 60 indicated in dot-dash outline is journalled therein. A suitable annular coil assembly 47, also generally indicated in dot-dash outline, is disposed about the tubular section 54a and a permanent magnet rotor, such as 24 shown in dot-dash outline, having a suitable number of poles is secured to the shaft 60 within the circle of poles. The fundamental principle of operation of this embodiment of the invention is similar to that of the generator of Figs. 1 to 3, inclusive, hence the operation of this generator or alternator will be understood in connection with the discussion hereinbefore made.

Figure 6:
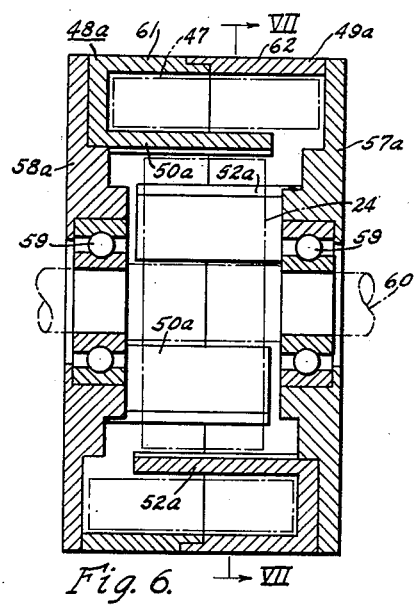
Figs. 6 and 7 are, respectively, longitudinal section and end views of a further modification of the invention.
Figure 7:
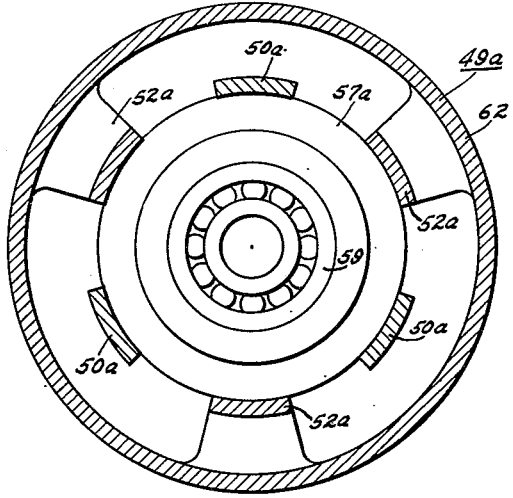

Another form which the generator or alternator may take is illustrated in Figs. 6 and 7. The magnetic members 48a and 49a are of somewhat different configuration than those previously described. With this design a shorter axial length of the alternator may be obtained, other things being equal, but a larger diameter results. The member 48a of magnetic material comprises a tubular section 61 which has attached or formed as a single piece therewith at one extremity a plurality of fingerlike pole pieces 50a which extend radially inwardly from the mentioned axial extremity for a portion of their length and thence extend in equal circumferentially spaced relation longitudinally through the tubular section 61. The length of the tubular section 61 is somewhat less than that of the longitudinally disposed portions of the pole piece. The member 49a having the fingers 52a and tubular section 62 is a substantial duplicate of the member 48a. These members are arranged such that their tubular extremities opposite to the extremities thereof which carry the pole pieces, are disposed in abutting relation or otherwise suitably mechanically joined. There is thus formed a magnetic circuit from a fingerlike pole piece as 50a which includes the radially disposed portion of such finger, the associated tubular section 61, the joint between the tubular sections, to the tubular section 62, and thence along a radially disposed portion of a pole piece as 52a to the longitudinal portion thereof. End plates 57a and 58a are disposed adjacent the axial extremities of the magnetic members and carry bearings 59 concentrically disposed of the pole circle formed by the pole pieces. A shaft indicated in dot-dash outline and numbered 60 is journalled between the bearings and a rotor 24, shown in dot-dash outline, is disposed securely on the shaft between the bearings to rotate in proximity to the pole pieces 50a and 52a. A suitable annular coil or assembly of coils 47, shown in dot-dash outline, is disposed about the circle of poles in the annulus formed between the pole pieces and the tubular sections 61 and 62. In a manner similar to the embodiments of Figs. 1 to 3, inclusive, and Figs. 4 and 5, the alternations of the magnetic flux in the magnetic circuit effected by rotative movements of the permanent magnet rotor induce voltages in the coil or coils linked thereby.

While the foregoing disclosure has been made in connection with a permanent magnet type of alternator, it will be apparent that a wound rotor energized by a suitable unidirectional current may be employed. It will be equally apparent that the teachings regarding the magnetic circuits are not necessarily limited to generators but may be equally applied to motors.

The foregoing disclosure and the showings made in the drawings are merely illustrative of the principles of this invention, and are not to be considered in a limiting sense. The only limitations are to be determined from the scope of the appended claims.

We claim as our invention:

1. A magnetic circuit structure for a rotating electrical machine comprising, in combination, a first member of magnetic material having a plurality of circumferentially spaced and axially extending finger-like elements joined at one extremity thereof by a transversely disposed element, a second member of magnetic material having a plurality of circumferentially spaced and axially extending finger-like elements of shorter length than the finger-like elements of the first member, each of the finger-like elements of the second member being joined at corresponding extremities by a transversely disposed element, said members being disposed in coaxial relationship such that said finger-like elements of each thereof are in circumferentially spaced interlocking relationship with the finger-like elements of each thereof extending in the same axial direction from each of the said transverse elements and terminating at their free extremities in a common transverse plane, a split tubular section of magnetic material coaxially disposed between and abutting at its extremities the confronting faces of said transverse elements, a section of magnetic material extending through said transverse elements and said tubular section and having portions thereof securely engaging the remote faces of said transverse elements to effect secure joining thereof, and a member of non-magnetic material engaging the free extremities of said finger-like elements to accurately radially space each of said finger-like elements.

2. A magnetic circuit structure for a rotating electrical machine comprising, in combination, a first member of magnetic material having a plurality of circumferentially spaced and axially extending finger-like elements joined at one extremity thereof by a transversely disposed element, a second member of magnetic material having a plurality of circumferentially spaced and axially extending finger-like elements of shorter length than the finger-like elements of the first member, each of the finger-like elements of the second member being joined at corresponding extremities by a transversely disposed element, said members being disposed in coaxial relationship such that said finger-like elements of each thereof are in circumferentially spaced interlocking relationship with the finger-like elements of each thereof extending in the same axial direction from each of the said transverse elements and terminating at their free extremities in a common transverse plane, a split tubular section of magnetic material coaxially disposed between and abutting at its extremities the confronting faces of said transverse elements, a section of magnetic material extending through said transverse elements and said split tubular section and having portions thereof securely engaging the remote faces of said transverse elements to effect secure joining thereof, a member of non-magnetic material engaging the free extremities of said finger-like elements to accurately radially space each of said finger-like elements, bearing means disposed in said member of nonmagnetic material concentrically of said finger-like elements, and bearing means concentrically disposed in said section of magnetic material at the extremity thereof adjacent the transverse element of said first member.

References Cited in the file of this patent

UNITED STATES PATENTS

| Number | Name | Date |
|---|---|---|
| 1,338,568 | Foote | Apr. 27, 1920 |
| 1,966,897 | Lofgren | July 17, 1934 |
| 1,976,880 | Graseby | Oct. 16, 1934 |
| 1,977,135 | Haydon | Oct. 16, 1934 |
| 2,000,516 | Haydon | May 7, 1935 |
| 2,080,371 | Hammond | May 11, 1937 |
| 2,403,567 | Wales | July 9, 1946 |

FOREIGN PATENTS

| Number | Country | Date |
|---|---|---|
| 1,069 | Great Britain | of 1912 |
| 7,087 | Great Britain | of 1891 |
| 280,947 | Germany | Dec. 2, 1914 |
| 304,254 | Germany | Oct. 1, 1920 |
| 451,447 | Great Britain | Aug. 6, 1936 |